United States Patent [19]

Moore, III

[11] 4,014,017

[45] Mar. 22, 1977

[54] SYSTEM FOR EDITING CHARACTERS

[75] Inventor: Harry W. Moore, III, Dryden, N.Y.

[73] Assignee: Sperry Rand Corporation, New York, N.Y.

[22] Filed: Aug. 13, 1975

[21] Appl. No.: 604,401

[52] U.S. Cl. .................... 340/324 AD; 340/365 R

[51] Int. Cl.² .......................................... G06F 3/14

[58] Field of Search ........ 340/324 A, 324 AD, 337, 340/365 R; 355/20

[56] References Cited

UNITED STATES PATENTS

| | | | |
|---|---|---|---|
| 3,737,890 | 6/1973 | Salava | 340/324 AD |
| 3,742,482 | 6/1973 | Albrecht et al. | 340/324 AD |
| 3,872,460 | 3/1975 | Fredrickson et al. | 340/324 AD |
| 3,911,419 | 10/1975 | Bates et al. | 340/324 AD |

*Primary Examiner*—Marshall M. Curtis
*Attorney, Agent, or Firm*—Thomas J. Nikolai; Kenneth T. Grace; Marshall M. Truex

[57] ABSTRACT

A system for editing characters stored in a memory is provided with a maximum count register and address counter means. The data at the address in memory desigated by the address counter means is removed from memory and temporarily stored in an output register. Data in an input register is then transferred to said address in memory and the data in the output register is then supplied to the input register. The address counter means is counted one count and the sequence is repeated until the count in the maximum count register is equal to the count or address in the address counter means. A delete edit function is accomplished by decrementing the address counter means and an insert edit function is accomplished by incrementing the address counter means.

10 Claims, 7 Drawing Figures

| A | B | C |
|---|---|---|
| H | H | L |
| L | H | H |
| H | L | H |
| L | L | H |

| A | B | C |
|---|---|---|
| H | H | L |
| H | L | L |
| L | H | L |
| L | L | H |

SYSTEM FOR EDITING CHARACTERS

BACKGROUND OF THE INVENTION

1. Field of the Invention

The present invention relates to visual display terminals associated with memory banks of a computer system. More particularly, this invention relates to control means for visual display terminals which perform the editing of any of the characters displayed on the visual panel of the display terminal which are representative of data characters stored in the memory.

2. Description of the Prior Art

In numerous computer systems it is desirable to visually examine the content of memory in a printed page or tabular format having columns and rows of alpha numeric characters. It is further desirable to be able to change or edit single characters, words or lines of alpha numeric characters and to store the edited printed page format back into the display memory, and from there back into the mass memory of the computer system.

Visual display terminals such as those shown in U.S. Pat. No. 3,466,645 are manufactured by the Sperry Rand Corporation and are provided with keyboard function keys and data entry keys which permit edit operation such as a delete or insert operation. The shift-edit operation in such devices permits the data to roll or be displayed in a scroll format fashion. Heretofore, the preferred manner of implementing the shift-edit function was to employ very large shift registers which would permit a display in scroll fashion. Large multiple output shift registers used in the prior art are relatively slow, expensive and are not overly tolerant of ionizing radiation.

Heretofore, numerous prior art visual display terminals employed numerous discrete components and employed procedures which operated to lock out other functional uses of the visual display terminal.

Semiconductor manufacturers have suggested that microprocessors may be employed as a substitute for hard wired logic to provide a sequence of programs which would simplify circuitry required to perform logical functions such as edit functions. Special design microprocessors are relatively expensive and are very slow when compared to hard wired integrated circuit gating logic.

Heretofore, the control circuitry in a visual display terminal which was employed to accomplish memory shift and edit functions was expensive, complex, relatively slow and so designed as to prevent the useful operation of the visual display terminal for other useful work. In those visual display panels which did not lock out the operation of other functions, the edit functions were so time consuming as to preempt any attempt to accomplish other useful work.

SUMMARY OF THE INVENTION

The present invention provides a simple, cheap, reliable and independently operable edit function control system having fewer parts than prior art control devices.

The present invention provides an extremely fast edit function control circuit employing commercially available integrated circuit logic devices.

It is the general object of the present invention to provide a novel edit function control circuit which eliminates the need for large scale shift registers and may be implemented with radiation hard bi-polar integrated circuit devices and memory.

It is another general object of the present invention to provide a novel edit function control circuit in which the sequence of control operations are independently operable under the control of an address control counter associated with a maximum count register and a comparator.

It is another general object of the present invention to provide an edit function control circuit with a minimum number of parts which may be embodied in new designs of visual display panels or easily included in existing equipment or existing designed equipment.

It is another object of the present invention to provide an edit function control circuit having design logic which may be implemented with very fast and/or very cheap existing integrated circuit modules or be implemented in a single LSI package. The design logic may be implemented by hard wiring medium scale integrated circuits.

These and other objects of the present invention are achieved by simplifying the logic for performing edit functions by eliminating circulating shift registers and then providing fast acting self contained logic. The data characters to be edited are stored in a memory which is accessible by an address counter. The character to be altered or moved during editing is removed from the memory and passed through a two element loop which comprises only three steps. After each operation on a data character in memory a comparison is made in the logic circuitry to determine if the address of the data character operated on was located in the last address to be altered, and if so, the edit function is terminated.

DESCRIPTION OF THE PREFERRED EMBODIMENTS

Figure 1:
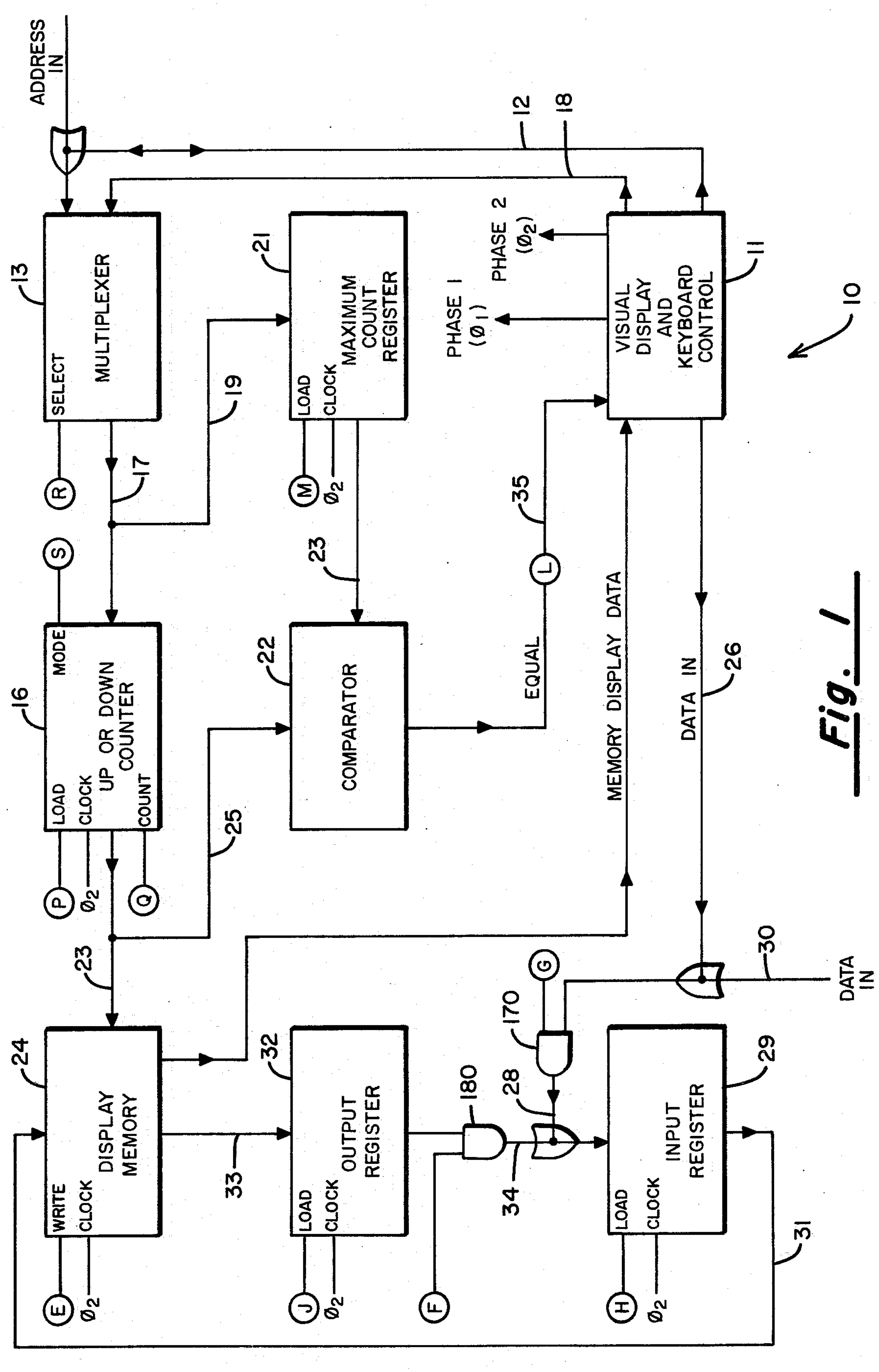
FIG. 1 is a general block diagram of the system for editing characters.

Refer now to FIG. 1 showing in block diagram the functional elements of the system for editing characters 10. The visual display and keyboard control 11 may be any standard visual display which has a full alphanumeric keyboard, a cursor address locator and provision for at least the principal edit control functions including the insert and delete functions. Such visual display means are commercially available from numerous manufacturers. The novel edit control system to be explained hereinafter may be embodied in or included as a modification of prior art display terminals mentioned hereinbefore.

When new data is to be inserted into the memory at a predetermined address, the data already in the memory is to be preserved and moved to the right hand column. The data in the right most column of a horizontal row will be inserted at the left most column of the next horizontal row similar to editing printed copy. The last character in the matrix of columns and rows may be lost during the insert function if the matrix is full, or can be moved onto the next page of display memory if the display memory is a multipage display memory.

To facilitate the location of the display memory address corresponding to the row and column in the matrix, the preferred embodiment display terminals include a cursor (not shown) which is positioned over or at the desired data character to be removed or where the new data character is to be inserted in memory. The address of the data character position may be provided by keyboard control 11 on line 12 to multiplexor 13. The address from multiplexor 13 is set in the up or down counter 16 via line 17. To prevent insertion of data beyond the address capacity of the display memory, the largest address or maximum address is supplied from keyboard control 11 via line 18 to multiplexor 13. The maximum address is supplied as a maximum allowable memory count via lines 17, 19 to maximum count register 21 whose output is continuously available as a maximum count to comparator 22 via line 23.

The current address, *n*, of the cursor is gated through multiplexor 13 through the up or down counter 16 whose count is always available as the address input via line 23 to display memory 24 and to comparator 22 via line 25. The new data character to be inserted at address *n* is provided on line 26 from keyboard 11. The new data character on lines 26, 28 is set into register 29 where it is made available to display memory 24 via line 31.

Under control of timing signals from the keyboard control 11, display memory 24 reads the memory contents of the current data character address *n* indicated by the up or down counter 16 and loads the current data character into register 32 via line 33. With the current data character preserved in register 32, the new data character stored in register 29 is now written into display memory 24 via line 31 at the current address *n* indicated by the up or down counter 16. The current data character removed from display memory 24 to make way for the now inserted data character is transferred from register 32 to register 29 via line 34. Under control of the timing signals from keyboard control 11, the up or down counter 16 is incremented by one count. The new count ($n+1$) on line 23, 25 is compared in comparator 22 to determine if the maximum count stored in the maximum count register has been reached. If the maximum count has not been reached, the display memory 24 now reads the memory contents of the next data character address (the $n+1$ address) indicated by the up or down counter 16 and loads the contents of the $n+1$ address into register 32. The contents of register 29 (the contents of the original address *n*) are now written into display memory 24 via line 31 and the contents of register 32 are transferred to register 29. Again, the up or down counter 16 is incremented to provide an address corresponding to $n+2$ and the comparison process is repeated until the comparator 22 indicates on line 35 that the maximum count register 21 equals the up or down counter count which signals the completion of the cycle to the keyboard control 11.

At the end of the cycle, the cursor will move one space to the right (as is normal) so that the next memory address may be written with new data. At the end of the cycle the cursor position may be changed by more than one space by means of a manual key-in or a computer input to the visual display and keyboard control 11.

If the edit function had been performed at the request of the program in a computer, as opposed to a manual keyboard entry, the initial cursor address would be set in the keyboard control 11 by the computer via line 12. In this case the new data would not come into register 29 via line 26, but rather via line 30.

When the cursor is positioned over or at the desired character at the desired row and column, the insert character key (not shown) is depressed indicating that the next character pressed on the keyboard 11 is to be stored where the cursor is now located. When the character key to be inserted is depressed, the keyboard is not totally locked out but a busy light (not shown) or other indicator may be turned on to indicate that the edit function is in process, and no display modifying keys may be used. During the time required for insertion of the character, the visual display unit 11 may be employed to communicate with the central processor or used to perform other useful work. At the end of the edit function sequence the busy light goes off and the cursor should advance to the next position on the display (i.e., the next address).

When old data in memory is to be deleted, the cursor is positioned over the desired character and the delete character key (not shown) is depressed indicating that the character at the cursor is to be deleted and that zeros will be written into the maximum of highest count address location.

The address of the cursor (not shown) is provided on line 12 from keyboard control to multiplexor 13 and passed via lines 17, 19 to the maximum count register 21 whose output is continuously available to comparator 22 via line 23. The maximum count is provided from keyboard control 12 on line 18 to multiplexor 13 and via line 17 to up or down counter 16 where it is available to comparator 22 via lines 23, 25 and to display memory 24 via line 23. The delete function may generate a signal on data in line 26 indicative of a plurality of 0's. The zero signals are supplied via lines 26, 28 to register 29 where they are available to display memory 24 via line 31. After the contents of display memory 24 at the maximum address are read into register 32, the zero data character stored in register 29 is written into memory at the maximum address indicated by the up or down counter 16 via line 23. The data character stored in register 32 is now transferred to register 29 via line 34. Under control of the timing signals from the keyboard control 11, the up or down counter 16 is decremented by one count. The maximum address minus one (max-1) count on lines 23, 25 is compared in comparator 22 with the address count *n* (indicated by the maximum count register 21) to determine if they are equal. If the up or down counter 16 has not reached the count identifying address *n* to be deleted, the data character in display memory 24 at memory address max-1 is read into register 32 via line 33. The contents of register 29 are transferred into the memory address max-1 via line 31 and subsequently the max-1 data character in register 32 is transferred to register 29. The up or down counter 16 is again decremented and the address max-2 is supplied via line 23, 25 to display memory 24 and comparator 22. If the address max-2 is equal to the address set in the maximum count register 21, the equal signal on line 35 to the keyboard control 11 causes the last cycle to be initiated. Upon the completion of the last cycle, the cursor will move to the next position on the display (next address) and the busy light will go out indicating the completion of the delete-edit function sequence.

In the above explanation of an insert and delete sequence operation, it is not necessary that the display memory 24 has characters stored in every memory address of the memory matrix. It is possible to set a different maximum count in maximum count register 21 or in up and down counter 16 which is representative of the last address in which characters are to be store or changed. (For example a screen lockout for high priority data could be implemented in such a manner.) It is preferable to store all zeros in the address positions where no character is to be stored and to represent the absence of a character by the presence of all zeros (all zeros in memory is visibly a blank screen).

Figure 2:
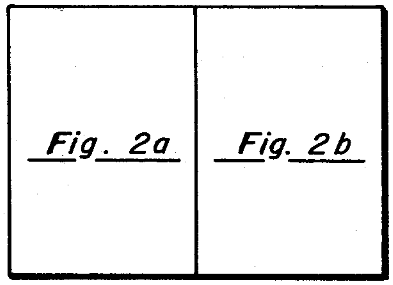
FIG. 2, comprising

FIG. 2 shows the more detailed circuit diagram of the control logic for the system of FIG. 1. The phase 1 and phase 2 pulses (shown in FIG. 3) are timing pulses generated at the keyboard control 11 are employed to enable the operation of the logic circuits. The start-edit, insert and delete pulses are generated by the keyboard control timing circuits either as a result of the depression of the respective function keys (not shown), or upon commands from a computer.

Figure 3:
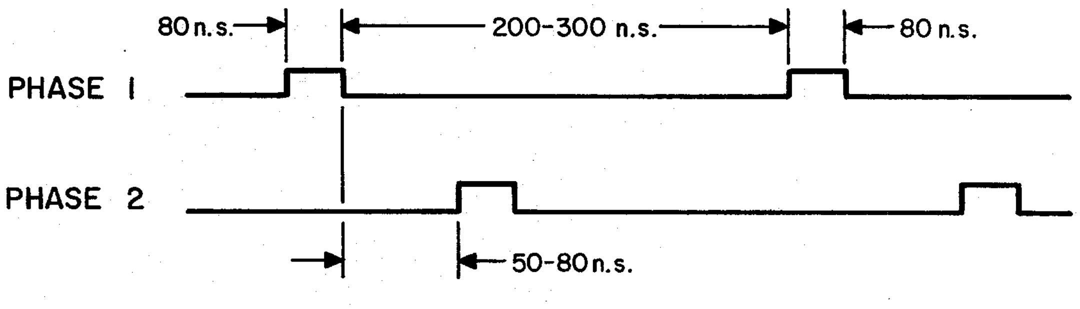
FIG. 3 is a timing diagram of the preferred clock pulses.

The phase 1 and phase 2 pulses shown are generated in keyboard control 11 and need only be alternately timed pulses which are separated in time sufficient for solid state logic gates to perform a sequence of operations to be described hereinafter. FIG. 3 shows a preferred timing relationship between phase 1 and phase 2 pulses. Visual display terminals of the type mentioned hereinbefore are provided with a plurality of timing signals which are available for use with the present invention when it is installed in existing visual display terminal panels.

Figure 4:
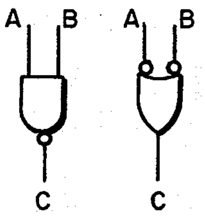
FIGS. 4 and 5 are truth tables defining the symbols and logic functions of NAND and NOR gates.
Figure 5:
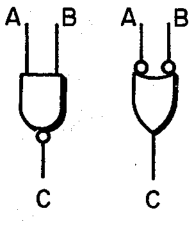
Figure 2A:
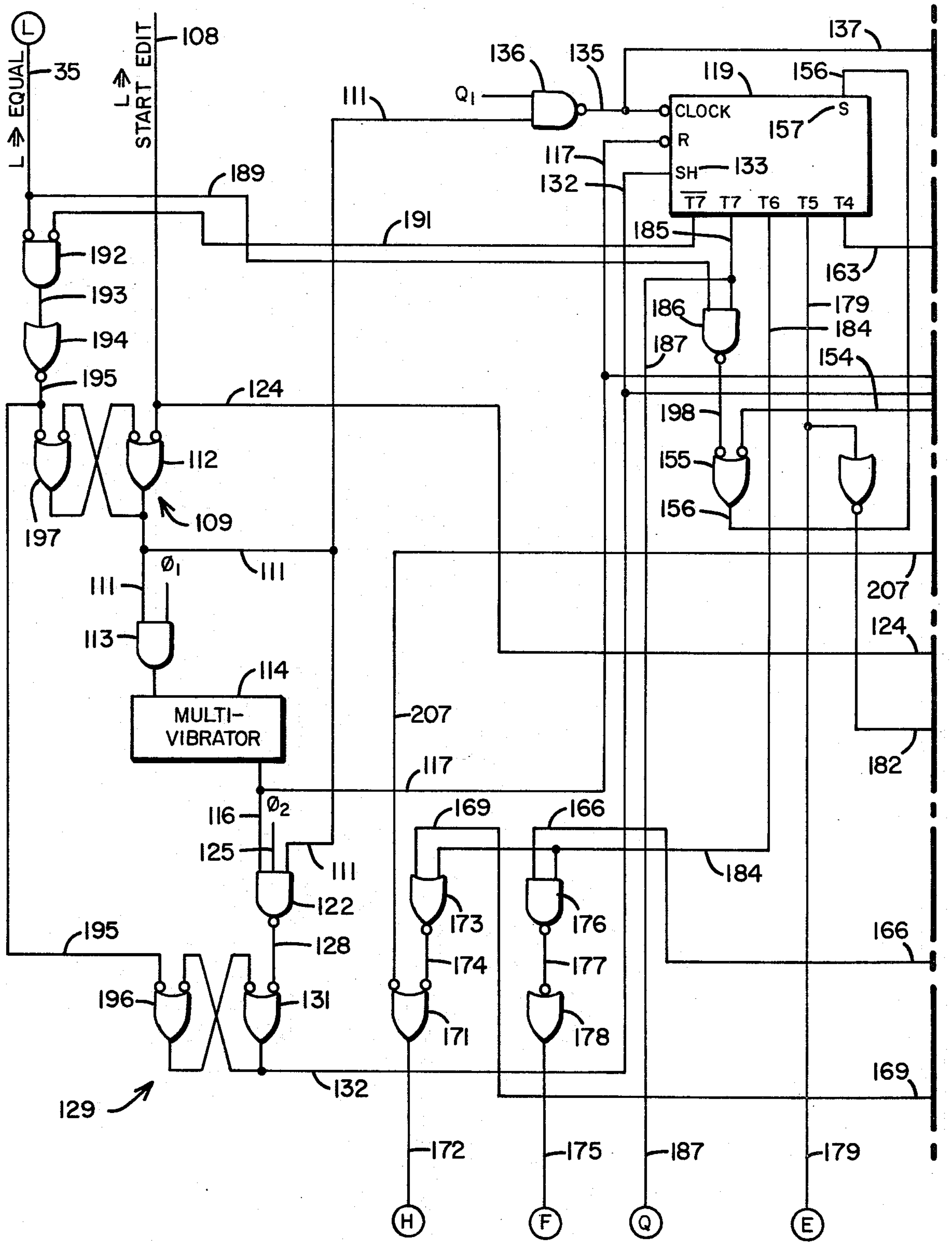
FIGS. 2*a* and 2*b*, is a circuit diagram of the control logic of the system of FIG. 1.
Figure 2B:
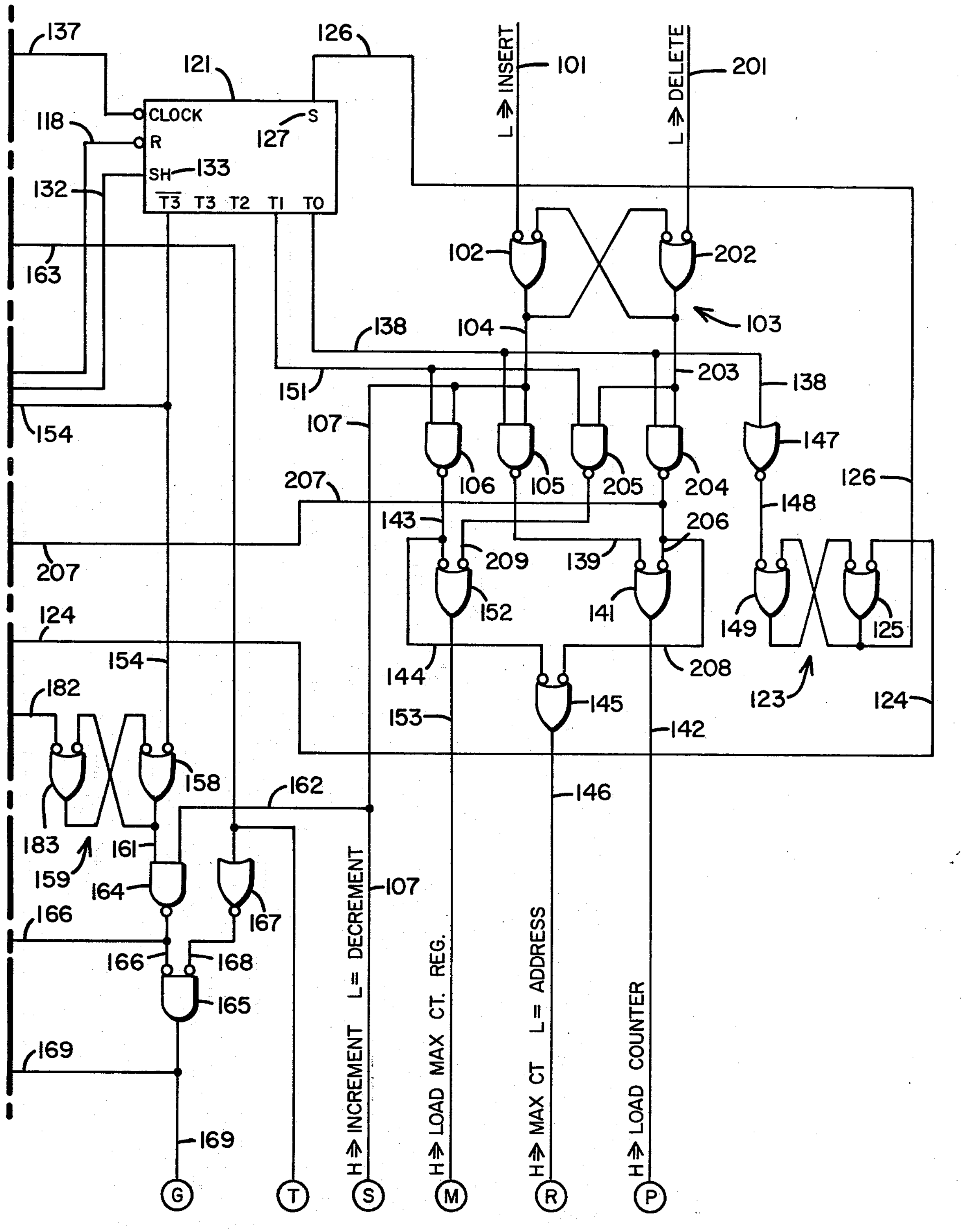

For purposes of this invention, the logic gates employed in FIG. 2 are NAND and NOR gates. The symbols and a truth table for the NAND gates employed are shown in FIG. 4 and the symbols and a truth table for the NOR gates are shown in FIG. 5. The NAND gates require any one or more low inputs to generate a high output and when all inputs are high a low output is produced. The NOR gates require any one or more high inputs to generate a low output and when all inputs are low a high output is produced. The manner in which the logic gates are operated will be explained with reference to FIG. 2 and to high and low input and output conditions.

Assume that an insert-edit function is to be performed and that the cursor has been positioned over a character. The insert key (not shown) on keyboard control 11 is then depressed. A start-edit pulse and insert mode pulse will be generated. Line 101 of FIG. 2 receives the low active insert mode pulse which is applied to NAND gate 102 of flip-flop 103 to produce a high active output on line 104 of the set side of flip-flop 103. The high active signal on line 104, partially enables NAND gates 105–106 and 164 and also generates a high increment count signal at terminal S via line 107. Initiation of the insert key and the following data key cause the keyboard control 11 to generate a low active start-edit pulse which is applied to line 108. The start-edit pulse on line 108 sets flip-flop 109 which produces a high active output on line 111 from NAND gate 112 which is applied to one input of AND gate 113 and a phase 1 pulse is applied to the other. On the next phase 1 pulse, the high active output from AND gate 113 triggers one shot multivibrator 14 creating a low active pulse of approximately 50 to 80 nanoseconds duration on line 116. The low active signal on lines 116, 117 and 118 clears shift registers 119 and 121. When the multivibrator 114 times out and returns to its high active state, the high signal on line 116 partially enables NAND gate 122. The low active start-edit pulse on line 108 is also applied to flip-flop 123 via line 124 to produce a high active pulse from the set side of NAND gate 125 on line 126. The high active signal on line 126 is applied to the shift input terminal 127 or shift register 121.

When the first phase 2 pulse is generated after the start enable pulse has caused line 111 to go high, three input NAND gate 122 will produce a low active signal on line 128 which sets shift flip-flop 129. The high active signal from the set side of NAND gate 131 produces a high active signal on line 132 which is applied to enable terminals 133 and 134 of shift registers 119 and 121. The shift registers enable signal on line 132 will remain high until terminated by an equal signal from comparator 22 as will be explained hereinafter.

When the next phase 1 pulse is generated, after shift registers 119 and 121 are enabled, a one will be set into or shifted into shift register 121 at terminal 127. The high active phase 1 pulse and the high active pulse on line 112 drive the output 135 of NAND gate 136 low producing a clock signal on line 137 which strobes in the one count at terminal 127. The count in shift register 121 creates a high active signal on line 138 from output terminal T-0. Line 138 causes NAND gate 105 to produce a low active signal on line 139. The low active signal on line 139 produces a high active signal from NAND gate 141 on line 142 and at terminal P which enables the loading of up or down counter 16 when the next phase 2 pulse strobes in the count from multiplexor 13 via line 17. The address in on line 12 from keyboard 11 supplies multiplexor 13 with the address count signal. Multiplexor 13, which is enabled by selection terminal R, selects the address input to be passed on to up or down counter 16. Terminal R is low because terminal T-1 of Register 121 is low and terminal T-0 is high. The output of NAND gate 106 at line 143 is high and NAND gate 204 has a high output since a delete function is not being performed. Lines 144 and 208 are high and the output of NAND 145 on line 146 is low. The low active signal on line 146 at terminal R informs multiplexor 13 that it is in the mode to load the address in up or down counter 16.

The high active signal from terminal T-0 on line 138, is inverted at inverter 147 and resets flip-flop 123 when the low active signal on line 148 is applied to the reset NAND gate 149. Flip-flop 123 drives line 126 and shift input terminal 127 low and off insuring that the shift register 121 is only active to receive one count per edit function. It is for this reason that the start edit signal on line 108 must be a reasonably short pulse (less than two phase times).

When the next phase 1 pulse becomes active at NAND gate 136, the clock pulse on line 137 shifts registers 119 and 121 causing terminal T-1 to go high and terminal T-0 to become low. Line 151 at terminal T-1 becomes high and activates NAND gate 106 and lines 143, 144 become low active enabling NAND gates 152 and 145. The output of NAND gate 152 on line 153 creates a high active signal at terminal M generating the load signal for entering the maximum count in register 21. Register 21 is loaded with the maximum count by the next phase 2 pulse. NAND gate 145 has a low input on line 144 and has a high input on line 146 at terminal R. Terminal R connects to the selection input of multiplexor 13 and enables the maximum count signal on line 18 to be set into the maximum count register 21 via line 19.

The next phase 1 pulse causes a clock signal on line 137 to shift registers 119 and 121 creating a high active signal at terminal T-2 which is not used. The outputs on line 142 and 153 have become low and inactive when terminals T-0 and T-1 became low and inactive. The next phase 1 pulse generates a clock pulse on line 137 which drives terminal T-3 high and terminals T-2, T-1 and T-0 are now low. Terminal $\overline{T\text{-}3}$, which is an inverted output of terminal T-3, goes low because T-3 is high. The low active signal on line 154 from terminal $\overline{T\text{-}3}$ of register 121 enables NAND gate 155 and creates a high active output signal on line 156 which enables the shift input terminal 157 of shift register 119. The low active signal on line 154 is also applied to NAND gate 158 and sets flip-flop 159. The high active outputs on lines 161, 162 at NAND gate 164 creates a low active output on line 166 which will enable NOR gate 165 when terminal T-4 is high.

Shift register 121 has reached its highest count and shift register 119 has been enabled at terminal 157. The next phase 1 pulse on line 135 causes terminal T-4 of shift register 119 to become high active. The high active signal at terminal T-4 on line 163 is applied to terminal J which is the load register terminal for register 32. Generation of the load register 32 signal at terminal J enables the initial contents of display memory 24 at the address to be altered (designated by up or down counter 16 via line 23) to be loaded into register 32 by a phase 2 clock pulse. During the loading of register 32 the output line 34 is always blocked.

The high active signal at terminal T-4 also causes register 29 to be loaded with the new data to be entered into the memory gates 171, 173, 165, 164 and 167. Flip-flop 159 is still set and the high active signal on lines 161, 162 generate a low output from NAND gate 164 on line 166. There is a high active signal on line 163 from terminal T-4 and the output of NOR gate 167 is low on line 168. The two low active inputs to NOR gate 165 generate a high active output on line 169 at terminal G. Terminal G is connected to a plurality of gates 170 which enable data to be entered into register 29 from the keyboard control 11 shown or from other storage media not shown. Register 29 will be enabled to store the data when NAND gate 171 generates the enabling signal on line 172 at terminal H. Gate 171 is enabled when the high signal on terminal G at line 169 is applied to NOR gate 173 to maintain the output of line 174 low. After terminal H goes high, the next phase 2 pulse at register 29 strobes in the data character on line 28. This is the same phase 2 pulse employed to transfer the contents of display memory 24 into register 32. Line 34 from register 32 to register 29 is blocked by terminal F until terminal T-6 of shift register 119 goes high. Terminal F at line 175 remains low until a high active signal from terminal T-6 of shift register 119 goes high causing NAND gate 176 to produce a low active output on line 177. The low active output on line 177 is inverted at inverter 178 to produce the high active enabling pulse at terminal F on line 175.

The next phase 1 pulse on line 135 causes shift register 119 to shift terminal T-5 high, terminals T-0 through T-4 are low. There is a high active signal terminal from T-5 on line 179 to terminal E which enables writing in memory 24. The high active signal on line 179 is inverted in inverter 181 and the low active signal output on line 182 resets or clears the first word flip-flop 159 when NAND gate 183 is activated. Terminals G and H are driven low by the change of state of the first word flip-flop 159.

The next phase 2 pulse after terminal E goes high, clocks or strobes the outside data stored in register 29 into memory 24 via line 31. This information is written or stored into the address being indicated by the up or down counter 16 via line 23. For the insert function, the first word address is the address indicated by the cursor and is the word or data character position selected for the insertion of outside data. During the transfer of a data character from display memory 24 to register 32, line 34 is blocked by terminal F which is held in its low state by terminal T-6 of shift register 119.

The next phase 1 pulse on line 135 causes shift register 119 to shift terminals T-6 high, and T-5 through T-0 are low. The high active output on lines 184, 166 generate a low active output from NAND gate 176 on line 177 which is inverted at inverter 178 creating a high active output on line 175 on terminal F. The high active signal on Terminal F at AND gate 180 (which is typical of a plurality of gates) enables the transfer of the contents of register 32 via line 34 to register 29. The high active output on line 184 generates a low output from NOR gate 173 on line 174 which enables a high active output from NAND gate 171 on line 172 and on terminal H. Terminal H enables the loading of register 29 when it is strobed or clocked by the next phase 2 pulse.

The next phase 1 pulse on line 135 causes shift register 119 to shift terminal T-7 high and terminals $\overline{T\text{-}7}$ and T-6 through T-0 are low. The high active output on line 185 enables NAND gate 186 unless equal line (35) is low. Line 185 is connected as a high active signal to terminal Q via line 187. Terminal Q enables the up or down counter 16. When the next phase 1 pulse is generated, the output of comparator 22 on line 35 at terminal L and on line 189 is high because the maximum count register is not equal to the count in the up or down counter 16. At phase 2 time, counter 16 is incremented or counted one count. There is a high active signal on line 107 to terminal S indicating that the mode of up or down counter 16 is in the increment mode. If the count (address) in up or down counter 16 is now equal to the count in maximum count register 21, comparator 22 will produce a low active output on terminal L at line 35 and line 189. Line 191 from $\overline{T\text{-}7}$ is low enabling NOR gate 192. When the lines 35 and 191 are both low at T-7 time, the high output from NOR gate 192 produces a high output on line 193 which is inverted at inverter 194 and applied on line 195 to NAND gate 197 of flip-flop 109 and to NAND gate 196 of shift flip-flop 129. When flip-flops 109 and 129 are reset, they disable the shifting of shift register 119 and 121. The low active signal on line 111 from the set side of flip-flop 109 disables NAND gate 122 and NAND gate 136 which completes a sequence of operations. If terminal L does not go low, indicating that the count in the maximum count register 21 is not equal to the count in the up or down counter 16, the word in the display memory 24 at the next higher address count must be shifted over.

When terminal L is high indicating that the counts are not equal, the high signal on line 189 is applied to NAND 186. When terminal T-7 becomes high, the output on line 185 is high and the output of gate 186 becomes low on line 198. The low active input on line 198 to NAND gate 155 produces a high active output on line 156 enabling the count input terminal 157 of shift register 119. The next phase 1 pulse will drive terminal T-7 low and terminals T-4 and $\overline{T\text{-}7}$ will become high.

When terminal T-4 of shift register 119 goes high again, the sequence described above will be repeated starting at the previous T-4 high signal. The data character in display memory 24 at the new address location indicated by the up or down counter 16 will be shifted out of memory 24 to register 32 and the data in register 29 will be stored in its place in memory 24. The contents of register 32 will then be transferred to register 29 and the counter 16 will be incremented again. If the comparison of the new count in counter 16 is equal to the maximum count in register 21, terminal L will go low and NAND gate 192 will produce a high output on line 193 which will terminate the sequence by resetting flip-flops 109 and 129. It will be understood that the sequence will be repeated until a comparison is indicated by the low active signal on terminal L.

The delete function is similar to the insert function and the two functions employ the same registers, counters, and comparator of FIG. 1 and a major portion of the logic shown in FIG. 2. In the delete mode, the data in one address in memory is removed. The character to the right of the data character being deleted is moved over to the left one character position leaving a blank space at the last character memory address which is filled with zeros. When the cursor is positioned at the character to be deleted, or the address of the character is supplied via line 12, and a computer initiates the delete function or the delete character key (not shown) is depressed to initiate the removal of the data character at the address indicated, the character to be removed is not removed until the last and final sequence of operations as will be explained. The last address in display memory 24 is removed first and is stored in register 32. Zeros are loaded into register 29 and then stored in the last address in display memory 24. The data character from the last address in memory 24 is transferred to register 29 from register 32. The address in the up or down counter is decremented and the data character in the next-to-the-last address in memory 24 is removed and stored in register 32. The data character in register 29, which is the data character from the last memory address, is then transferred to memory 24 and the next-to-last data character in register 32 is then transferred to register 29. This operation is repeated over and over until the address count in the up or down counter 16 which is being decremented equals and compares with the address count of the character to be deleted in the maximum count register 21. When the equal signal occurs on terminal L and line 35, the sequence will be terminated and the data character to be deleted will be left in register 29 and lost or destroyed when register 29 is loaded again.

A computer command or the depression of the delete function key (not shown) generates a low active signal on line 201 at NAND gate 202 and a high active output signal on line 203 which partially enables NAND gates 204 and 205. The delete command on line 201 resets flip-flop 103 creating a low active signal on lines 104 and 107 at terminal S. The low active signal on terminal S is connected to the mode input terminal of the up or down counter 16 and causes the counter to decrement when the clock signals or count pulses are applied. The delete command also initiates a start-edit pulse on line 108 which sets flip-flop 109. The low active start-edit pulse on lines 108 and 124 sets flip-flop 123 generating a high active signal on line 126 which is applied to the shift input terminal 127 of shift register 121. Flip-flop 109 also triggers multivibrator 114 on the next phase 1 pulse which clears shift registers 119 and 121. When multivibrator 114 times out, it will enable NAND gate 122 which will produce a low active pulse on line 128 when the next phase 2 pulse becomes active. When shift flip-flop 129 becomes set, the high active signal on line 132 at terminals 133 and 134 enables the shifting of registers 119 and 121. The next phase 1 pulse which is generated after shift flip-flop 129 has enabled registers 119 and 121 causes the count at terminal 127 to be shifted into register 121 and terminal T-0 becomes high active at line 138. The high active signal on line 138 resets flip-flop 123 and also drives the output of NAND gate 204 low. The low active signal on line 206 is applied via line 207 to NAND gate 171. NAND gate 171 is enabled by the low active signal on line 207 and produces a high active signal on line 172 at terminal H. The high active signal on terminal H produces the load register signal at register 29 which will enable register 29 to be loaded with all zeros. In the preferred embodiment, it is not necessary during a delete operation to supply an all zeros data character from the keyboard control 11. When terminal T-0 is high during a delete operation gate 165 and 178 have low outputs at terminals G and F so that no data character is presented on lines 28 and 34, and when both the clock signal and the load signal are present, register 29 is loaded with zeros. When the present invention is embodied into other types of visual display systems, it may be desirable to change the all zero data character to some other form. The word being inserted does not have to be a word of all zeros. All ones or any predetermined acceptable character is permissible. The keyboard control 11 or an outside data source can supply data on line 28. The low active output signal from gate 204 may be used as a zeros data signal on lines 28 and 34.

The high active signal on line 138 produces a low active signal output from NAND gate 204 and a high active signal output on line 142 at terminal P which enables the maximum count on line 18 from the keyboard control 11 to be routed through the multiplexor 13 and set or stored in the up or down counter 16. The low active signal on lines 206, 208 drives the output of NAND gate 145 high and this high active signal on line 146 at terminal R enables the multiplexor 13 to select and load the maximum count in counter 16.

The next phase 1 pulse is gated through NAND gate 136 and applied as a clock pulse via line 137 to shift register 121 to shift terminal T-1 high and terminal T-0 low. The high active signal on line 151 from terminal T-1 to NAND gate 205 produces a low active signal on line 209 at NAND gate 152. The high active output signal from NAND gate 152 on line 153 drives terminal M high and active which enables the address on line 12 from keyboard control 11 to be routed through the multiplexor 13 and set or stored in the maximum count register 21. The low active signal on lines 206, 208 have caused NAND gate 145 to become high active on line 146 at terminal R which enables the multiplexor 13 to select and load the address of the data character to be deleted into the maximum count register 21.

Two phase 1 clock pulses later, terminal T-3 is driven high and terminal $\overline{T-3}$ is driven low. The low active signal on line 154 causes NAND gate 155 to present a high active signal via line 156 to the shift register input terminal 157 of shift register 119. The low active signal from terminal $\overline{T-3}$ on line 154 also sets the first word flip-flop 159 producing a high active signal on line 161. The delete function on line 201 has caused lines 104, 107 and 162 to remain low, thus, blocking NAND gate 164. Line 166 stays high and the output of NOR gate 165 on line 169 at terminal G is low, thus, no outside data on line 28 is presented to register 29. Terminal F is low and the transfer of data from register 32 is also blocked. Register 29 has been previously loaded with zeros when T-0 was high and terminal H was also high. The load register signal on terminal H is now low and inactive.

The next phase 1 clock pulse on line 135 produces a high active signal at terminal T-4 and on line 163 at terminal J. The high active signal on terminal J at register 32 causes the data character in the last address in memory 24 to be loaded into register 32 at phase 2 time.

The next phase 1 clock pulse on line 135 produces a high active signal at terminal T-5 of shift register 121 and on line 179 at terminal E at memory 24 which causes the all zeros data character in register 29 to be written into the last memory address in memory 24 as designated by up or down counter 16 at phase 2 time.

The next phase 1 clock pulse on line 135 produces a high active signal at terminal T-6 of shift register 121 and on line 184 which drives the output of NAND gate 176 low. The low active output of NAND gate 176 on line 177 is inverted at inverter 178 and produces a high active output on line 175 at terminal F. The high active output on terminal F at register 29 enables the data characters stored in register 32 to be transferred to register 29. The high active output on line 184 drives the output of NOR gate 173 low on line 174. The output of NAND gate 171 is driven high on line 172 at terminal H. The high active output on terminal H at register 29 enables the contents of register 32 to be stored in register 29 at phase 2 time.

The next phase 1 clock pulse on line 135 produces a high active signal at terminal T-7 and a low active signal at terminal $\overline{T-7}$ of shift register 121. The high active signal at terminal T-7 on line 185 raises a high active signal at terminal Q via line 187. The high active signal on terminal Q at the up or down counter 16 enables the counter to be decremented one count. The count in up and down counter 16 is compared with the count in the maximum count register and when the counts become equal, a low active signal on line 35 at terminal L is produced. If the count in counter 16 is not equal to the count in register 21, the high active signal on line 35 is passed via line 189 to NAND gate 186 which has been enabled by the high active signal on terminal T-7. If the comparisons are not equal, a low active signal from NAND gate 186 on line 198 generates a high active signal from NAND gate 155 on line 156 which places the high active shift input at terminal 157 of shift register 119. The next active phase 1 count will start the count sequence of operations at shift registers 119 all over again. When the comparison becomes equal, the low active signal at terminal L on line 35 generates a high active output on line 193 from NOR gate 192 which is inverted in inverter 194. The low active signal on line 195 resets flip-flop 109 and flip-flop 129 which clears shift registers 119 and 121 and terminates the operation as explained hereinbefore with regard to the insert operation.

When the comparison at comparator 22 does not produce the low active equal sign on line 35, counter 16 is decremented and the data character in display memory 24 at the new count or address is transferred to register 32 via line 33. The data character from the next higher address location or count is transferred from register 29 to display memory 24 via line 31. Then the data character just stored in register 32 is transferred to register 29 and the counter is decremented and the comparison again made until comparator 22 determines that the count in the up or down counter 16 is the same as the data character address count in the maximum count register 21. When the equals comparison does occur, the data character in the address location to be deleted is now stored in register 32 and when the operation is terminated and the registers and counters cleared, this data character at the address to be deleted is lost.

The system for editing characters is capable of being operated from a visual display keyboard or from a remote station. The lines connecting the registers and counters have been shown as single data lines. It will be understood that these single lines are representative of a plurality of lines which define a data character or address and the preferred embodiment is illustrated for parallel operation. FIGS. 1 and 2 may be modified to enable the parallel operation disclosed to be adapted to serial operation.

Having explained the preferred embodiment with a delete and an insert operation, other edit operations which employ the same or modified sequence of operations may be developed to use the disclosed system.

I claim:

1. A system for editing characters stored in a memory comprising:

memory means for storing data representative of a plurality of characters to be displayed, visual means connected to said memory means for displaying said plurality of characters in a matrix of columns and rows, keyboard control means having a plurality of data entry keys, edit function keys and means for generating addresses designating the address of each of said characters in said memory by columns and rows, counter means operably connected to said keyboard control means and settable with a first address in said memory means to be edited, a maximum count register operably connected to said keyboard control means and settable with a last address in said memory means to be edited, an output register connected to said memory means for receiving and storing characters from said memory means at the address indicated by said counter means, an input register operably connected to said keyboard control means for receiving and storing edit characters and operably connected to said output register for receiving and storing characters from said memory means, and comparison means for comparing the address in said counter means with the address in said maximum count register and for generating a signal indicating the completion of an edit function, whereby the depression of the edit function key initiates an edit function in said keyboard control means which sequentially transfers the character in said memory means designated by said counter means to said output register and said character in said input register to the designated address in said memory means, then transfers the character in said output register to said input register and increments the counter means one count to designate a new address in said memory means to permit the repetition of the edit function until said comparison means generates a signal indicating a comparison has been made.

2. A system for editing characters as set forth in claim 1 which further includes an external source for supplying characters to said input register.

3. A system for editing characters as set forth in claim 1 wherein said keyboard control means further comprises logic control circuitry connected to said registers, said memory means and said counter means for performing a plurality of operations in sequence which accomplish edit functions.

4. A system for editing characters as set forth in claim 3 wherein said logic control circuitry of said keyboard control means further includes a shift register having a plurality of outputs each being activated sequentially to enable a plurality of logical gates which generate logical function signals which enable the transfer of character data to and from said memory means and which enables the transfer of address data to and from said counter means.

5. A system for editing characters as set forth in claim 4 wherein said keyboard control means further includes timing means connected to said registers, said memory means and said counter means providing a plurality of repetitive clock signals separated in time space one from the other for initiating the transfer of said character data and said address data.

6. A system for editing characters as set forth in claim 3 wherein one of said plurality of operations includes an insert edit function sequence wherein said counter means is set with the address of the character to be inserted and said maximum count register is set with the last address in said memory to be edited, and wherein said keyboard control means further includes timing means for incrementing said counter means until said comparison means generates a signal indicating the completion of said inserted function.

7. A system for editing characters as set forth in claim 3 wherein one of said plurality of operations includes a delete edit function sequence wherein said counter means is set with the last address in said memory to be edited and said maximum count register is set with the address of the character to be deleted, and wherein said keyboard control means further includes timing means for decrementing said counter means until said comparison means generates a signal indicating the completion of said delete function.

8. A system for editing characters set forth in claim 6 wherein said logic control circuitry provides a sequence of operations for removing said character in said memory means at the address designated by the counter means, storing said character in said output register and sequentially storing in said designated address in memory the character stored in said input register, then storing the content of the output register in said input register.

9. A system for editing characters as set forth in claim 7 wherein said logic control circuitry provides a sequence of operations for removing said character in said memory at the address designated by said counter means, storing said character in said output register and sequentially storing in said designated address in memory the character stored in said input register, then storing the content of said output register in said input register.

10. A system for editing characters as set in claim 1 which further includes a computer operably connected to said keyboard control and to said system for editing characters for performing said same edit function operations as the keyboard control.

* * * * *

UNITED STATES PATENT AND TRADEMARK OFFICE
CERTIFICATE OF CORRECTION

PATENT NO. : 4,014,017

DATED : March 22, 1977

INVENTOR(S) : H. W. Moore, III

It is certified that error appears in the above-identified patent and that said Letters Patent are hereby corrected as shown below:

Column 14:

Line 39, "performing said" should be -- performing the --.

Line 40, "as the keyboard" should be -- as said keyboard --.

Signed and Sealed this

Thirty-first Day of May 1977

[SEAL]

*Attest:*

RUTH C. MASON
*Attesting Officer*

C. MARSHALL DANN
*Commissioner of Patents and Trademarks*